United States Patent Office 3,356,768
Patented Dec. 5, 1967

3,356,768
MOLECULAR INCLUSION ADDUCTS OF
PHOSPHONITRILIC HALIDE TRIMER
DERIVATIVES
Harry Rex Allcock, Darien, and Lester Aaron Siegel, Stamford, Conn., assignors to American Cyanamid Company, Stamford, Conn., a corporation of Maine
No Drawing. Filed May 18, 1964, Ser. No. 368,383
9 Claims. (Cl. 260—927)

ABSTRACT OF THE DISCLOSURE

Molecular inclusion adducts of organic liquids and phosphonitrilic trimers, typically tris(o-phenylenedioxy) phosphonitrile trimer. Also disclosed are methods of preparing the adducts, by recrystallization and by direct, spontaneous absorption. The host phosphonitrilic trimers exhibit selective absorption and replacement of included organic liquids and are useful as organic desiccants and in the separation of organic liquids.

The present invention relates to novel adducts and methods of preparing same. More particularly, the instant discovery concerns the adduct of an inert organic liquid and the reaction product of a phosphonitrilic halide trimer with a substituted or unsubstituted catechol and a base. These reaction products are substituted or unsubstituted trispiro[1,3,5,2,4,6-triazatriphosphorine-2,2′; 4,2″; 6,2′′′-tris(1,3,2)benzodioxaphosphole] or trispiro [1,3,5,2,4,6 - triazatriphosphorine - 2,2′; 4,2″; 6,2′′′ - tris (1,3,2)benzodithiophosphole] or trispiro[1,3,5,2,4,6-triazatriphosphorine-2,2′; 4,2″; 6,2′′′-tris(1,3,2)benzothiooxaphosphole] prepared according to the following equation:

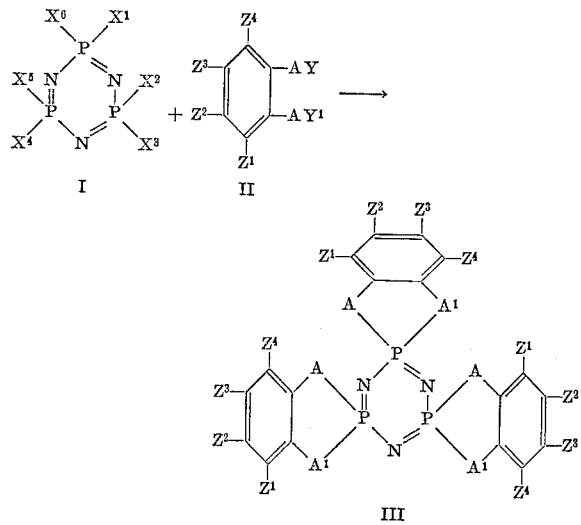

wherein $X^1$ through $X^6$ each represent chlorine or bromine, $Z^1$ through $Z^4$ each represent hydrogen, lower alkyl, halogen, lower alkoxy, nitro, halogeno(lower)alkyl, or other similar inert (stable) substituents, Y and $Y^1$ each represent hydrogen or alkali metal, and A and $A^1$ each represent oxygen or sulfur. This reaction, described and claimed in copending U.S. application Ser. No. 264,763, filed Mar. 13, 1963, the continuation-in-part application of which is now U.S. Patent 3,294,872, is made to take place in the presence of an organic solvent and the base is one which is capable of forming stable salts with hydrogen chloride or hydrogen bromide.

Typical bases useful for this invention are: alkali metal hydroxides and carbonates, such as potassium, sodium and lithium hydroxides and carbonates; alkaline earth hydroxides and carbonates, such as calcium, magnesium, barium, and ammonium hydroxides and carbonates; quaternary ammonium hydroxides, such as benzyltrimethylammonium hydroxide, tribenzylmethylammonium hydroxide, and tetraalkyl(lower)ammonium hydroxide; guanidines and biguanides, such as hexaalkyl(lower)biguanide, heptaalkyl(lower)biguanide, and tetraalkyl (lower)guanidine; triaalkyl(lower)amines, such as triethylamine, tributylamine, and trimethylamine; ammonia; pyridine; and the like.

Typical organic solvents for this reaction are: ethers, such as dioxane, diethoxyethane, dimethoxyethane, diethylether of diethylene glycol, and tetrahydrofuran; aromatic hydrocarbons, such as benzene, toluene, xylene, mesitylene; acetonitrile; dimethylformamide; dimethylsulfoxide; halogenated aliphatic ($C_1$–$C_8$) hydrocarbons, such as chloroform, trichloroethylene; ketones, such as acetone, diethyl ketone, methylethyl ketone, diisobutyl ketone; and the like. An excess of the base, such as pyridine, trialkylamine, and the like, may be used as the solvent if such base is liquid at reaction temperature. Preferably, however, the solvents listed above are employed.

While the reactions are best carried out at temperatures in the range of 25° C. to 100° C., temperatures in the range of 0° C. to 200° C. are contemplated herein. Likewise, atmospheric pressure is preferred, but super-atmospheric pressures and sub-atmospheric pressures may be employed, generally with an accompanying change in temperature. For instance, at super-atmospheric pressures higher temperatures may be employed, since the boiling point of the solvent varies as the pressure thereon. Generally, when operating at atmospheric pressure, temperatures below the boiling point of the solvent are employed.

Usually, three moles of the catechol or thiocatechol, substituted or unsubstituted, are brought into reactive contact with the phosphonitrilic trimer reactant. It has been found, however, that less than stoichiometric amounts or even greater than stoichiometric amounts may be reacted without upsetting the nature of the reaction. Therefore, the mole ratio is not critical. Usually, one mole of base is employed per mole of replaceable hydrogen (Y) ($Y^1$) on the catechol reactant. Of course, if Y and $Y^1$ both represent an alkali metal, no base is needed.

According to the present invention the compounds of Formula III, above, form unusual molecular inclusion adducts with a wide variety of inert organic liquids, such as aliphatic and aromatic hydrocarbons, esters, ethers, ketones, carbon disulfide, and the like. Apparently, the compound of Formula III physically traps a guest organic compound in its (III) crystal lattice in cavities or channels which result from its unusual molecular configuration. X-ray single crystal and powder diffraction data suggest that at 25° C. pure, sublimed crystals of III exist as monoclinic or triclinic structures with an 8-molecule unit cell. The adduct form apparently exists as a hexagonal structure which contains 2 molecules of III and usually not more than 1 molecule of guest compound.

The molar ratio of guest to host, however, appears to depend on the molecular dimensions of the included, or guest, species. Larger molecules, such as norbornadiene, are present in a guest to host molar ratio of 1 to 2, but smaller molecules, such as acetone, are present in the lower ratio of 1 to 5. As will be seen hereinafter, when mixed organic liquids of the type contemplated herein are brought into contact with III, aliphatic compounds, such as hexane, heptane, $CCl_4$, and the like, are incorporated into the crystal lattice of III in preference to cyclic compounds, such as benzene, cyclohexane, and the like.

Typical methods of preparing the adducts of the present invention will now be shown. According to one (R)

method the host compound III is dissolved in a very dilute solution of the guest compound in view of the low solubility of the hosts in early all solvents, except boiling xylene. Very dilute solutions of benzent, chlorobenzene, styrene, chloroform, cyclohexane, tetrachloroethane, or the like, are used to dissolve the host compound III and the latter is then recrystallized therefrom. The recrystallized material is filtered off, air dried, and then dried for at least twenty-four hours in vacuum at 25° C.

Another typical method of preparing the aducts of the present invention is by spontaneous absorption (SA) of the liquid guest by the crystalline host. When the host is treated with an excess of guest organic liquid at room temperature, an exothermic crystal disruption and absorption of the guest organic compound occur. Excess liquid is removed by air drying followed by vacuum drying for twenty-four hours at 25° C. This is a very efficacious way of forming the adducts of the present invention when using mixed or unmixed organic liquids.

As will be seen hereinafter, it is possible to replace certain guests with others, in view of the selective nature of the host III compounds of the present invention. This is accomplished by first absorbing an organic compound, in the manner just described in the host compound, drying same, and subsequently adding a second organic liquid compound to the adduct. Included benzene, for example, can be totally displaced by xylene, carbon disulfide, or the like, using the process just described. Still another (V) method of preparing the adducts herein contemplated involves vapor absorption. For example, a sublimed sample of host compound III is placed in an open glass vial and suspended within a closed vessel above the surface of the guest liquid, such as chloroform, benzene or the like. At atmospheric pressure and 25° C. temperature spontaneous absorption of the guest liquid to form adducts takes place. After, say, twelve hours the vial is removed and the solid adduct therein vacuum dried.

The dried adducts of the present invention are stable at room temperature, and no significant loss of included compound occurs upon prolonged exposure to the atmosphere at room temperature, or upon applying vacuum of 0.1 millimeter mercury at 25° C. for several days. However, some included materials, such as benzene, can be driven off with more drastic treatment, such as prolonged heating at 80° C. to 100° C. at 0.1 millimeter pressure. The residual host compound then reverts to the original crystal structure.

It is by now obvious to the skilled chemist that the process and products of the present invention are extremely useful and significant. Since the host compound III of the instant discovery forms inclusion compounds with many organic liquids, wide application of the use of these host materials in the separation and selective absorption of guests can be made. The host, as will be demonstrated more thoroughly hereinafter, is reuseable. Typically, the host compounds may be used to remove trace impurities from liquids. As just demonstrated, benzene containing small amounts of xylene or carbon disulfide may be thoroughly rid of these latter two materials by contacting the crude benzene with the host crystals of the present invention.

Obviously, also, this opens up the whole field involving the use of the host compounds for hydrocarbon separation and as organic desiccants.

Typical inert organic liquids within the purview of the present invention are (a) substituted and unsubstituted, branched and straight chain alkanes, alkenes and alkadienes having from 1 to 12 carbon atoms; (b) substituted and unsubstituted benzenes; (c) substituted naphthalenes; (d) substituted and unsubstituted cyclopentane, cyclopentene, cyclopentadiene, cyclohexane, cyclohexene and cyclohexadiene; (e) esters,

of the above wherein R represents substituted and unsubtituted alkyl having from 1 to 12 carbon atoms, phenyl, substituted phenyl, naphthyl and substituted naphthyl; (f) ethers of the formula R—A—R, wherein R is the same as above and A is O or S; (g) ketones of the formula

wherein R is the same as above; and (h) carbon disulfide.

Typical substituents for (a), above, are halo (Br, Cl, I, and F), lower alkoxy, nitro, cyano, hydroxy, and the like; for (b) are halo, lower alkoxy, nitro, cyano, lower alkyl, and the like; for (c) are halo, lower alkoxy, nitro, alkyl, hydrogen, lower alkyl, and the like; for (d) are halo, lower alkoxy, nitro, lower alkyl, and the like; for R are halo, lower alkoxy, nitro, lower alkyl, and the like.

These are merely typical guest organic liquids which will form inclusion adducts with the phosphonitrillic trimers III of the present invention. Characteristically, organic compounds in liquid state have an affinity for the host compounds III of the present invention and form molecular inclusion clathrates therewith.

The present invention will best be understood from the following examples, the first thirteen of which describe the preparation of the host compounds III of the present invention and the remaining examples describe adduct formation. It is not intended that these examples, which are illustrative, unduly limit the scope of the present invention, except insofar as these limitations appear in the appended claims:

EXAMPLE I

*Trispiro[1,3,5,2,4,6-triazatriphosphorine-2,2'; 4,2''; 6,2'''-tris(1,3,2)benzodioxaphosphole]*

Phosphonitrilic chloride trimer (10.44 grams; 0.03 mole) and catechol (9.9 grams; 0.09 mole) are dissolved in toluene (500 milliliters) and to this stirred solution is added triethylamine (18.8 grams; 0.18 mole). A further 9.0 grams of triethylamine and 4.5 grams of catechol are added and the mixture is stirred at 25° C. for 72 hours. The resulting white precipitate is filtered off, washed with toluene and dried, yielding 35.2 grams of material which is extracted with boiling benzene. The extracts, when evaporated to dryness, yield 3 grams of a white solid having a melting point of 235° C. This is purified by recrystallization from benzene, followed by sublimation at 230° C. to 240° C. at 0.05 millimeter mercury pressure to yield a product having a melting point of 243° C.–244° C. Analysis of this product indicates it is trispiro[1,3,5,2, 4,6-triazatriphosphorine-2,2'; 4,2''; 6,2'''-tris(1,3,2)benzodioxaphosphole].

EXAMPLE II

In a glass vacuum system, phosphonitrilic chloride trimer (6.96 grams; 0.02 mole) and catechol (6.6 grams; 0.06 mole) are dissolved in dry pyridine (100 milliliters) at 0° C. The stirred mixture is heated gradually from 0° C. to 25° C. over 72 hours, and from 25° C. to 70° C. over 1 hour, after which it is maintained at this temperature for 8 hours and then stirred at 25° C. for another 16 hours. The resulting white precipitate (2 grams) is filtered off and recrystallized from benzene to give white product crystals having a melting point of 245° C. which analyze as trispiro[1,3,5,2,4,6 - triazatriphosphorine-2,2'; 4,2''; 6,2'''-tris(1,3,2)benzodioxaphosphole].

EXAMPLE III

Phosphonitrilic chloride trimer (20.8 grams; 0.06 mole) and catechol (19.8 grams; 0.18 mole) are dissolved in tetrahydrofuran (500 milliliters) and triethylamine (55.6 grams; 0.55 mole) is added quickly with stirring. This mixture is refluxed for 2 hours and filtered hot. The resulting insoluble material (66.3 grams) is extracted with boiling benzene (1000 milliliters) which, when cooled, yields crystals which analyze as trispiro[1,3,5,2,4,6-triazatriphosphorine-2,2'; 4,2''; 6,2'''-tris(1,3,2)benzodioxaphosphole], melting point 244° C.–245° C. The infrared spectrum of this material is identical with those of Examples I and II, above.

EXAMPLE IV

A solution of catechol (95 grams, 0.804 mole) and triethylamine (175 grams, 1.728 mole) in tetrahydrofuran (500 milliliters) is added slowly to a stirred solution of phosphonitrilic chloride trimer (100 grams; 0.288 mole) in tetrahydrofuran. After completion of the addition the resulting mixture is refluxed for 2 hours and is stirred at 25° C. for 48 hours.

A white solid is thus formed and it is filtered off dried (350 grams), and washed with water to remove triethylamine hydrochloride and to leave a white powdery residue (136 grams). This material is subjected to prolonged extraction with toluene and benzene in a soxhlet apparatus. The extracts, when cooled, yield a total of 30.5 grams of trispiro[1,3,5,2,4,6 - triazatriphosphorine-2,2';
4,2''; 6,2'''-tris(1,3,2)benzodioxaphosphole] which, when recrystallized from benzene, melts between 244° C. and 245° C. and has an infrared spectrum identical to those of Examples I through III, above.

EXAMPLES V–XIII

Example I, hereinabove, is repeated in every essential respect in each of the following examples, excepting as shown in the table:

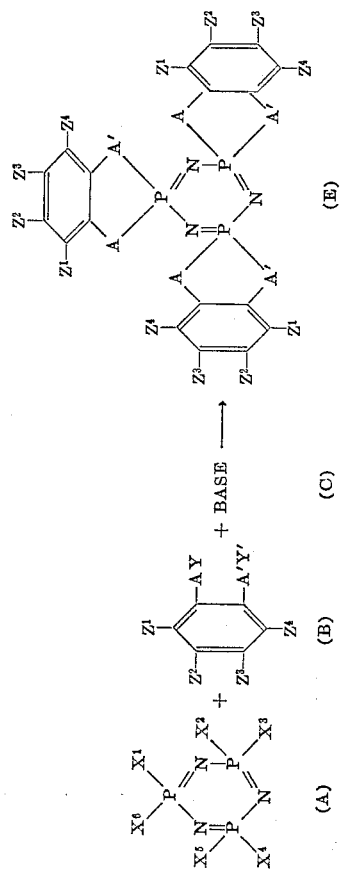

TABLE I

| Example No. | $X^1$ | $X^2$ | $X^3$ | $X^4$ | $X^5$ | $X^6$ | A | A' | $Z^1$ | $Z^2$ | $Z^3$ | $Z^4$ | Y | Y' | Base | Mole ratio A:B:C | Temp., °C. | Solvent |
|---|---|---|---|---|---|---|---|---|---|---|---|---|---|---|---|---|---|---|
| V | Cl | Cl | Cl | Cl | Cl | Br | O | O | H | $OC_2H_5$ | H | H | H | H | Triethylamine | 1:3:6 | 100 | Dioxane. |
| VI | Br | Br | Br | Br | Br | Br | O | O | $CH_3$ | $CH_3$ | $CH_3$ | $CH_3$ | H | H | Pyridine | 1:3:6 | 70 | Tetrahydrofuran. |
| VII | Cl | Cl | Cl | Cl | Cl | Cl | O | O | H | $CH_2Cl$ | $CH_2Cl$ | H | H | H | Ammonia | 1:3:6 | 100 | Dimethylformamide. |
| VIII | Br | Br | Br | Br | Br | Br | O | O | H | $OCH_3$ | $OCH_3$ | Cl | H | Na | Sodium hydroxide | 1:3:3 | 100 | Acetone. |
| IX | Cl | Cl | Cl | Cl | Cl | Cl | O | O | Cl | Cl | Cl | Cl | K | K | None | 1:3:6 | 50 | Dimethylformamide. |
| X | Cl | Cl | Cl | Cl | Cl | Cl | S | S | H | H | H | H | H | H | Ammonium hydroxide | 1:3:6 | 100 | Tetrahydrofuran. |
| XI | Cl | Cl | Cl | Cl | Cl | Cl | S | S | H | $CH_2CH_2CH_3$ | H | H | H | H | Tetraethylguanidine | 1:3:6 | 70 | Chloroform. |
| XII | Br | Br | Br | Br | Br | Br | S | S | Br | Br | Br | Br | H | H | Benzyltrimethylammonium hydroxide | 2:3:6 | 70 | Trichloroethylene. |
| XIII | Cl | Cl | Cl | Cl | Cl | Cl | O | O | H | $NO_2$ | H | H | H | H | Sodium carbonate | 1:3:6 | 70 | Tetrahydrofuran. |

In the above Table I the corresponding product (E) is prepared in each example, wherein $Z^1$ through $Z^4$ correspond to the same symbols found in the columns under reactant (B).

Unless otherwise specified, the adducts in the following example (Table II) are prepared, as described hereinabove, by spontaneous absorption of the liquid guest by the crystalline host and the guest:host molar ratios determined by weight increase after vacuum drying; the host in each example in Table II is trispiro[1,3,5,2,4,6-triazatriphosphorine-2,2'; 4,2''; 6,2'''-tris(1,3,2)benzodioxaphosphole]:

TABLE II

| Example No. | Organic Liquid (Guest) | Guest:Host Molar Ratio | Adduct Melting Range, °C. |
|---|---|---|---|
| XIV | Tetralin | 0.59 | 220–230 |
| XV | Norbornadiene | 0.51 | 236–275 |
| XVI | Isooctane | 0.48 | 231–245 |
| XVII | Trans-Decalin | 0.47 | 237–245 |
| XVIII | o-Xylene | 0.46 | |
| XIX | o,m and p-Xylenes | [1,2] 0.50 | 241–256 |
| XX | Cumene | 0.45 | 228–248 |
| XXI | Cyclohexane | 0.41 | 233–245 |
| | | [2] 0.50 | |
| XXII | n-Heptane | 0.38 | 247–253 |
| XXIII | Styrene | 0.38 | 239–256 |
| | | [2] 0.50 | 244–257 |
| XXIV | Ethyl acetate | 0.37 | 233–243 |
| XXV | Carbon Tetrachloride | 0.37 | 233–244 |
| XXVI | Tetrahydrofuran | 0.35 | 233–244 |
| XXVII | Chloroform | 0.34 | 224–245 |
| | | [3] 0.48 | 240–244 |
| | | [2] 0.66 | |
| XXVIII | Methyl Methacrylate | 0.33 | 230–267 |
| XXIX | Diethyl ether | 0.31 | 226–243 |
| XXX | Benzene | 0.25 | 222–245 |
| | | [3] 0.27 | 244–255 |
| | | 0.44 | |
| | | [1,2] 0.50 | |
| XXXI | Acetone | 0.20 | 231–250 |
| XXXII | Carbon disulfide | [4] 0.20 | 226–239 |
| XXXIII | Acrylonitrile | 0.19 | 230–257 |
| XXXIV | Ethanol | [4] 0.11 | 231–243 |

[1] By mass-spectrometry of recrystallized material.
[2] By microanalysis of recrystallized material.
[3] By weight loss on heating of recrystallized material.
[4] Mixture of triclinic and hexagonal forms.

The following Table III shows the use of mixed organic liquids and adductifying in the same manner (same host, also) taught for the examples of Table II, above:

TABLE III

| Example No. | Organic Liquid (Guest) | Molar Ratio Guest/Guest (Initial Mixture) | Molar Ratio Guest/Guest (Adduct)[1] |
|---|---|---|---|
| XXXV | Heptane/cyclohexane | 0.74 | 100 |
| XXXVI | Hexane/benzene | 0.73 | 20 |
| XXXVII | Hexane/cyclohexane | 0.91 | 33 |
| XXXVIII | CCl/benzene | 0.91 | 20 |

[1] Determined by mass spectrometry.

The host in all of the above Examples XIV–XXXVIII is prepared as in Example I and further purified by several recrystallizations from benzene or xylene followed by at least two sublimations at 230° C./0.1 millimeter pressure to remove included solvent. The host so purified melts at 244° C.–245° C.

The products of Examples I–XIII, above, are brought into contact with the following guest organic compounds by the respective methods (R), (SA) and (V) described hereinabove and molecular inclusion of the guest liquid in the host crystals is thus made to take place:

TABLE IV

| Example No. Host | Organic Liquid Guest | Method |
|---|---|---|
| V | Dodecane | R. |
| VI | Hexadiene | R. |
| VII | Octene-2 | V. |
| VIII | 2-cyanoethane | V. |
| IX | 3-propoxynonane | V. |
| X | 1-nitroethane | V. |
| XI | 4-hydroxyheptane | SA. |
| XII | 3-nitrobutene-1 | SA. |
| XIII | Bromobenzene | R. |
| X | Ethoxybenzene | V. |
| VI | Nitrobenzene | R. |
| V | Cyanobenzene | V. |
| VII | Toluene | V. |
| XII | 1-chloronaphtalene | R. |
| X | 1-methoxynaphthalene | R. |
| X | Chloroform | V. |
| VI | Octyl propyl ether | R. |
| V | Cyclopentane | V. |
| XI | 1-chlorocyclohexane | SA. |
| VIII | Cyclohexadiene | V. |
| VII | Cyclopentadiene | V. |
| VI | 1-chlorocyclohexane | R. |
| XII | 1-propoxycyclopentane | R. |
| VII | do | V. |
| IX | Cyclopentene | V. |
| II | Butyl ester of octanoic acid | SA. |
| IV | Ethyl ester of 2-nitrohexanoic acid | SA or R. |
| I | 4-bromododecyl ester of 4-undecanoic acid | SA or R. |
| V | 1-nitropropyl ester of butanoic acid | SA or R. |
| IX | 3-ethoxyhexyl ester of acetic acid | SA or R. |
| V | Diethyl ether | V. |
| VIII | Ethyl hexyl thioether | V. |
| IX | Octyl propyl ether | SA. |
| VIII | 2-nitropropyl nonyl ether | SA. |
| VIII | 3-ethoxyhexyl dodecyl ether | SA or R. |
| II | 2-chlorophenyl propyl ether | SA. |
| II | Ethyl tolyl thioether | SA. |
| VI | Anisole | SA or R. |
| I | Phenetole | SA or R. |
| V | Phenyl ether | SA or R. |
| IX | Benzyl phenyl ether | V. |
| X | Naphthyl ether | SA or R. |
| III | Carbon disulfide | SA. |
| I | 3-pentanone | SA. |
| VI | Pinacolin | SA. |
| VIII | Acetophenone | SA or R. |
| II | Benzophenone | SA or R. |
| XIII | 1-phenyl-2-propanone | SA or R. |
| XI | 1-(3-bromophenyl)-3-butanone | SA or R. |
| VII | Butyrophenone | SA or R. |
| IV | Acetodecanone | SA or R. |
| VIII | 2-nitro-4-hexanone | SA. |
| II | 2(1,3-xylyl)-3-pentanone | SA. |
| XII | 2,3-pentanedione | V. |

Obviously, numerous other similar hosts and guests may be used successfully.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A molecular inclusion adduct of an inert organic liquid and a compound of the formula

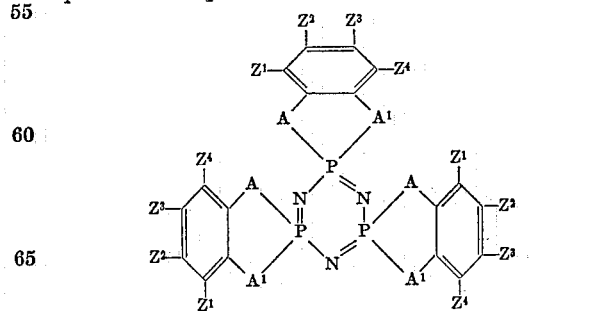

wherein $Z^1$ through $Z^4$ each represent a member selected from the group consisting of hydrogen, lower alkyl, halogen, lower alkoxy, nitro and halogeno(lower)alkyl, and A and $A^1$ each represent a member selected from the group consisting of oxygen and sulfur.

2. The adduct of claim 1 wherein the compound is trispiro[1,3,5,2,4,6-triazatriphosphorine-2,2'; 4,2''; 6,2''''-tris(1,3,2)benzodioxaphosphole].

3. The adduct of claim 1 wherein the inert organic liquid is a member selected from the group consisting of (a) substituted and unsubstituted, branched and straight chain alkane having from 1 to 12 carbons, substituted and unsubstituted, branched and straight chain alkene having from 1 to 12 carbon atoms, and substituted and unsubstituted, branched and straight chain alkadiene having from 1 to 12 carbon atoms; (b) substituted and unsubstituted benzene; (c) substituted naphthalene; (d) substituted and unsubstituted cyclopentane, substituted and unsubstituted cyclopentene, substituted and unsubstituted cyclopentadiene, substituted and unsubstituted cyclohexane, substituted and unsubstituted cyclohexene, and substituted and unsubstituted cyclohexadiene; (e) esters,

of (a), (b), (c) and (d), above, wherein R is a member selected from the group consisting of substituted and unsubstituted alkyl having from 1 to 12 carbon atoms, phenyl, substituted phenyl, naphthyl, and substituted naphthyl; (f) ethers of the formula R—A—R, wherein R is the same as above, R and R being the same or different, and A is selected from the group consisting of oxygen and sulfur; (g) ketones of the formula

wherein each R is the same as above, R and R being the same or different; and (h) carbon disulfide; the substituents for (a), above, being selected from the group consisting of halo, lower alkoxy, nitro, cyano, and hydroxy; the substituents for (b) being selected from the group consisting of halo, lower alkoxy, nitro, cyano, and lower alkyl; the substituents for (c) being selected from the group consisting of halo, lower alkoxy, nitro, hydrogen and lower alkyl; the substituents for (d) being selected from the group consisting of halo, lower alkoxy, nitro, and lower alkyl; and the substituents for R of (e), (f) and (g) being selected from the group consisting of halo, lower alkoxy, nitro and lower alkyl.

4. A method of preparing a molecular inclusion adduct of an inert organic liquid and a compound of the formula

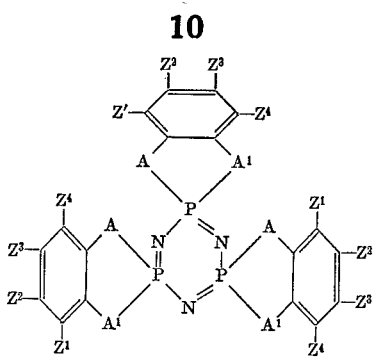

wherein $Z^1$ through $Z^4$ each represent a member selected from the group consisting of hydrogen, lower alkyl, halogen, lower alkoxy, nitro and halogeno(lower)alkyl, and A and $A^1$ each represent a member selected from the group consisting of oxygen and sulfur, which comprises bringing said compound into intimate contact with the inert organic liquid.

5. The method of claim 4 wherein the compound is dissolved in a dilute solution of the inert organic liquid and the compound is recrystallized.

6. The method of claim 4 wherein the inert organic liquid guest is absorbed by the host compound by contacting the compound with the liquid.

7. The method of claim 6 wherein absorption is made to take place by contacting the host compound with the vapors of the inert organic liquid.

8. The method of claim 4 wherein mixed inert organic liquids are treated with said host compound and said host compound selectively includes the non-cyclic components of said mixed liquids to the substantial exclusion of the remainder.

9. The method of claim 4 wherein the adduct formed is treated with at least one other inert organic liquid capable of displacing and replacing the included inert organic liquid of the adduct.

No references cited.

CHARLES B. PARKER, *Primary Examiner.*

A. H. SUTTO, *Assistant Examiner.*